United States Patent Office 2,876,266
Patented Mar. 3, 1959

2,876,266

PROCESS FOR THE PRODUCTION OF ALCOHOLS

Christian Wegner, Leverkusen-Bayerwerk, Germany, assignor to Farbenfabriken Bayer Aktiengesellschaft, Leverkusen, Germany, a corporation of Germany No Drawing. Application April 20, 1956
Serial No. 579,424

Claims priority, application Germany April 28, 1955

1 Claim. (Cl. 260—641)

This invention relates to a process for the production of alcohols.

It is known to effect the hydration of olefines and more especially the conversion of ethylene into ethyl alcohol by passing ethylene and steam over catalysts at temperatures of 250–320° C. and under such pressure that the reactants remain in gaseous form. Phosphoric acid deposited on a porous support is the most suitable catalyst. The reaction has, for example, been carried out by passing steam and ethylene in a molar ratio of 0.6:1 at 300° C. and a pressure of 70 atms. gauge over phosphoric acid deposited on a diatomaceous earth (Celite) (see for instance U. S. patent specification 2,579,601). In this process, 4.2% of the ethylene is reacted on being passed over the catalyst once and about 80 grams of ethyl alcohol per liter of catalyst are produced per hour. The reaction can be carried out as well in a fluidized bed and in this case 4.5% of the ethylene are reacted in a single passage. Catalysts which render possible a higher conversion of the olefine in a single throughput under otherwise the same conditions would correspondingly reduce the cost of production on a technical scale, because the capacity of the installation would be increased and above all there would be a saving in the heat energy required to bring the amounts of ethylene and water to the reaction temperature.

It is an object of the present invention to provide such catalysts. Other objects will appear hereinafter.

As I have found silico-phosphoric acids or salts of silico-phosphoric acids are particularly suitable as catalysts for the catalytic hydration of olefines and more especially of ethylene. Particularly suitable for this purpose are the silico-phosphoric acids with the composition of $SiP_2O_7$ or their salts $Me^I_2Si(PO_4)_2$.

If ethylene and water vapour are conducted in a constant ratio, and under the same condition as described above as regards pressure and temperature, over equal volumes of the various catalysts referred to in the following table, the amounts of alcohol indicated in this table are formed in the same periods of time. The yield which is obtained by the process given in U. S. Patent 2,579,601 on plant scale (Example 4) (phosphoric acid on Celite) has been indicated as 100.

| Catalyst | Yield of ethyl alcohol |
|---|---|
| $H_3PO_4$ on Celite (U. S. 2,579,601) | 100 |
| Free $H_2Si(PO_4)_2$ | 151 |
| Free $Si_3(PO_4)_4$ | 111 |
| Aluminium salt of $H_2Si(PO_4)_2$ | 160 |
| Aluminium salt of $H_2Si(PO_4)_2$, prepared from active aluminium silicate and $H_3PO_4$ | 170 |
| Cerium$^{II}$-salt of $H_2Si(PO_4)_2$ | 178 |
| Iron salt of $H_2Si(PO_4)_2$ | 175 |
| On the other hand: | |
| Acid aluminium phosphate $(AlH)_3(PO_4)_2$ | 11 |
| Acid-cerium-phosphate | 89 |

For the preparation of the salts of silico-phosphoric acid, freshly precipitated silica gel is added to the calculated amount of phosphoric acid and the corresponding metal hydroxide, prepared, for example by the action of ammonia on the nitrate, then introduced. The salt solution or suspension is then concentrated and the catalyst formed into balls or small rolls. For achieving particularly high activity, it has proved desirable to use a metal hydroxide, prepared from the nitrate and ammonia, which metal hydroxide has been incompletely washed and still contains some of the ammonium nitrate formed during the preparation. The shaped mass is then heated to a higher temperature than the reaction temperature of about 300° C., for example, to a temperature of 600° C., the escaping ammonium nitrate causing the moulded catalyst to become porous. An active aluminium silicophosphate can also be produced by the absorption of phosphoric acid in active moulded silicates, for example aluminium silicate in ball form, and subsequent drying. The inner part of the moulded aluminium silicate which is unchanged serves as skeleton and raises the desired solidity of the catalyst. If the aluminium silicate is artificially prepared, a ratio of $Al_2O_3:SiO_2$ of 1:6 to 1:8 is most advantageously used. On the other hand, by mixing an acid metal phosphate with silica gel, only inactive catalysts are obtained which consist of acid metal phosphate mixed with $SiO_2$.

It is essential for good activity of the said catalysts that they should have the largest possible surface i. e. the grain size of the catalysts should be as small as possible.

The time during which the catalysts are effective depends to a great extent from the purity of the ethylene used.

The catalysts to be employed according to the invention can also be used in the fluidised bed process.

Any subsidence in the activity of the catalyst is overcome by periodically adding small amounts of a mixture of silicic acid ester and trialkylphosphate in such a ratio that the active silico-phosphoric acid is formed by saponification taking place under the reaction conditions.

Sometimes it is sufficient to add only phosphoric acid to the moulded catalyst which forms with the surplus metal silicate contained in the catalyst new metal silico phosphoric acid.

The process according to the invention makes possible the hydration of olfines in a manner which is advantageous from an economic point of view.

Example 1

3100 liters of ethylene and 1500 grams of water vapour are hourly conducted at a temperature of 280–310° C. and a pressure of 72 atmospheres over 2.6 liters of a catalyst produced from active aluminium silicate in bead form by saturation with phosphoric acid, the said catalyst constituting the aluminium salt of the silicophosphoric acid $SiH_2(PO_4)_2$. 140–150 grams of 100% ethyl alcohol were produced per liter of catalyst. 6.2–6.5% of the ethylene were reacted in a single passage over the catalyst. By fractional condensation, the ethyl alcohol formed can be separated out as a 30% solution by weight.

Example 2

Freshly precipitated and washed aluminium hydroxide gel is mixed with silica gel in a ratio of 1:6. After a short drying period the mixture is formed to small particles having a diameter of about 6 mm. The particles are then treated with phosphoric acid heated to about 300–350° C. to obtain the desired solidity. A mixture of 3200 liters of ethylene (normal pressure) and 1500 grams of steam are conducted over 2.6 liters of the catalyst thus obtained at a pressure of 70 atmospheres in such a manner that 140 grams of 100% ethanol were produced per liter of catalyst. 5.8 to 6% of the ethylene were reacted in a single passage over the catalyst.

Example 3

One mol of freshly precipitated silica gel is treated with 2 mols of phosphoric acid to obtain silico phosphoric acid. Thereafter the silico phosphoric acid is reacted with ½ mol of freshly precipitated silver carbonate thus forming a compound of the formula $AgHSi(PO_4)_2$. The suspension obtained is concentrated and the compound formed into balls which are heated to about 400° C. After this treatment the catalyst owns the solidity required. By using this catalyst under the reaction conditions mentioned in Example 2, 120 grams of 100% ethyl alcohol were produced per liter catalyst per hour. 5.2% of the ethylene were reacted in a single passage over the catalyst.

I claim:

In the process for the production of alcohol by the contacting of ethylene with water in the gaseous phase in the presence of a catalyst for the hydration of the ethylene, the improvement which comprises effecting said contacting at a temperature of from about 280° to 310° C. in the presence of a catalyst from the group consisting of silicophosphoric acid and salts thereof formed from freshly precipitated silica gel.

References Cited in the file of this patent

UNITED STATES PATENTS

| | | |
|---|---|---|
| 2,173,187 | Tanner | Sept. 19, 1939 |
| 2,569,092 | Deering | Sept. 25, 1951 |
| 2,579,601 | Nelson et al. | Dec. 25, 1951 |

FOREIGN PATENTS

| | | |
|---|---|---|
| 158,853 | Australia | May 1, 1952 |